United States Patent
Soracco et al.

(10) Patent No.: US 8,323,122 B2
(45) Date of Patent: *Dec. 4, 2012

(54) METHOD OF MAKING GOLF CLUBS

(75) Inventors: Peter L. Soracco, Carlsbad, CA (US); Karl Clausen, Carlsbad, CA (US)

(73) Assignee: Cobra Golf Incorporated, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/192,394

(22) Filed: Jul. 27, 2011

(65) Prior Publication Data

US 2011/0277313 A1 Nov. 17, 2011

Related U.S. Application Data

(63) Continuation of application No. 12/468,129, filed on May 19, 2009, now Pat. No. 8,007,373.

(51) Int. Cl.
A63B 53/04 (2006.01)

(52) U.S. Cl. .................................................. 473/349

(58) Field of Classification Search .......... 473/324–350
See application file for complete search history.

(56) References Cited

U.S. PATENT DOCUMENTS

| | | | | |
|---|---|---|---|---|
| 2,880,002 A * | 3/1959 | Wetty | ............................. | 473/349 |
| 3,941,390 A * | 3/1976 | Hussey | ....................... | 473/292 |
| 3,961,909 A * | 6/1976 | Shapiro | ......................... | 428/613 |
| 4,162,794 A * | 7/1979 | Thompson | .................... | 473/328 |
| 4,331,477 A * | 5/1982 | Kubo et al. | ........................ | 75/228 |
| 4,710,223 A * | 12/1987 | Matejczyk | ....................... | 75/247 |
| 4,784,690 A * | 11/1988 | Mullendore | .................... | 75/248 |
| 4,851,042 A * | 7/1989 | Bose et al. | ........................ | 75/248 |
| 4,877,249 A * | 10/1989 | Thompson | ..................... | 473/349 |
| 4,938,816 A | 7/1990 | Beaman et al. | | |
| 4,992,236 A * | 2/1991 | Shira | ................................ | 419/28 |
| 5,062,638 A * | 11/1991 | Shira | ............................. | 473/350 |
| 5,222,542 A * | 6/1993 | Burke | ............................. | 164/97 |
| 5,441,695 A * | 8/1995 | Gladden | .......................... | 419/37 |
| 5,669,825 A * | 9/1997 | Shira | ............................. | 473/324 |
| 5,766,091 A * | 6/1998 | Humphrey et al. | ........... | 473/324 |
| 5,800,632 A * | 9/1998 | Arao et al. | ..................... | 136/251 |
| 5,938,543 A * | 8/1999 | McGeeney et al. | ........... | 473/324 |

(Continued)

FOREIGN PATENT DOCUMENTS

DE 4410046 C1 * 5/1995

(Continued)

OTHER PUBLICATIONS

International Search Report and Written Opinion PCT Application No. PCT/US2010/035286 mailed Aug. 4, 2010, in 13 pages.

(Continued)

*Primary Examiner* — Alvin Hunter
(74) *Attorney, Agent, or Firm* — Mark S. Leonardo; Brown Rudnick LLP

(57) ABSTRACT

A method for making golf club heads includes using direct metal laser sintering (DMLS), selective laser melting (SLM) and other computer controlled high energy sintering or melting techniques to form club heads with customized user parameters. The powdered metals can be selected by type and quantity to achieve a desired density or weight distribution. Club heads made by these techniques are characterized by having customized parameters chosen for individual golfers. By sintering powdered metal to form areas of different porosity, club heads with desired weight distributions can be achieved.

6 Claims, 2 Drawing Sheets

U.S. PATENT DOCUMENTS

| | | | |
|---|---|---|---|
| 6,099,414 A * | 8/2000 | Kusano et al. | 473/342 |
| 6,117,204 A * | 9/2000 | Saito et al. | 75/245 |
| 6,149,534 A * | 11/2000 | Peters et al. | 473/345 |
| 6,261,329 B1 * | 7/2001 | Ogata et al. | 51/309 |
| 6,322,746 B1 * | 11/2001 | LaSalle et al. | 419/6 |
| 6,364,788 B1 * | 4/2002 | Helmstetter et al. | 473/324 |
| 6,410,160 B1 * | 6/2002 | Landin et al. | 428/613 |
| 6,440,010 B1 * | 8/2002 | Deshmukh | 473/335 |
| 6,508,978 B1 | 1/2003 | Deshmukh | |
| 6,692,378 B2 * | 2/2004 | Shmoldas et al. | 473/340 |
| 6,723,278 B1 * | 4/2004 | Lu et al. | 419/6 |
| 6,723,279 B1 * | 4/2004 | Withers et al. | 419/27 |
| 6,737,017 B2 * | 5/2004 | Woodfield et al. | 419/30 |
| 6,878,074 B2 * | 4/2005 | Byrne et al. | 473/349 |
| 6,884,486 B2 * | 4/2005 | Estrin et al. | 428/45 |
| 7,108,613 B1 * | 9/2006 | Gordon et al. | 473/341 |
| 7,156,974 B2 * | 1/2007 | Strezov et al. | 205/398 |
| 7,172,519 B2 * | 2/2007 | Byrne et al. | 473/349 |
| 7,229,362 B2 * | 6/2007 | Tavares | 473/349 |
| 7,481,720 B2 * | 1/2009 | Tavares | 473/345 |
| 7,628,713 B2 * | 12/2009 | Tavares | 473/345 |
| 7,785,218 B2 | 8/2010 | Burnett et al. | |
| 7,993,216 B2 * | 8/2011 | Lee | 473/334 |
| 8,007,373 B2 * | 8/2011 | Soracco et al. | 473/349 |
| 2008/0235934 A1 | 10/2008 | Burnett et al. | |

FOREIGN PATENT DOCUMENTS

| | | | |
|---|---|---|---|
| EP | 1092470 A1 * | 4/2001 | |
| JP | 54074206 A * | 6/1979 | |
| JP | 04308048 A * | 10/1992 | |
| JP | 06063184 A * | 3/1994 | |
| JP | 06296717 A * | 10/1994 | |
| JP | 08257183 A * | 10/1996 | |
| JP | 08260162 A * | 10/1996 | |
| JP | 08308963 A * | 11/1996 | |
| JP | 08308964 A * | 11/1996 | |
| JP | 08308965 A * | 11/1996 | |
| JP | 08318010 A * | 12/1996 | |
| JP | 09154986 A * | 6/1997 | |
| JP | 09287003 A * | 11/1997 | |
| JP | 10158703 A * | 6/1998 | |
| JP | 10168506 A * | 6/1998 | |
| JP | 11009733 A * | 1/1999 | |
| JP | 11099228 A * | 4/1999 | |
| JP | 11104278 A * | 4/1999 | |
| JP | 11137742 A * | 5/1999 | |
| JP | 2000005355 A * | 1/2000 | |
| JP | 2000342726 A * | 12/2000 | |
| JP | 2001212270 A * | 8/2001 | |
| WO | 9629192 A1 | 9/1996 | |
| WO | WO 9629192 A1 * | 9/1996 | |
| WO | 9824574 A1 | 6/1998 | |
| WO | WO 9824574 A1 * | 6/1998 | |
| WO | 0021736 A1 | 4/2000 | |
| WO | WO 0021736 A1 * | 4/2000 | |
| WO | 0100892 A1 | 1/2001 | |
| WO | WO 0100892 A1 * | 1/2001 | |
| WO | 0211928 A1 | 2/2002 | |
| WO | 0211929 A1 | 2/2002 | |
| WO | WO 0211928 A1 * | 2/2002 | |
| WO | WO 0211929 A1 * | 2/2002 | |
| WO | 2006009340 A1 | 1/2006 | |
| WO | WO 2006009340 A1 * | 1/2006 | |
| WO | 2006063469 A1 | 6/2006 | |
| WO | 2009036240 A1 | 3/2009 | |
| WO | 2010135344 A1 | 11/2010 | |

OTHER PUBLICATIONS

Wiley, Neil Hopkinson, Rapid Manufacturing: An Industrial Revolution for the Digital Age, 2006, ISBN 0470016132.

Society of Manufacturing Engineers, Todd Grimm, User's Guide to Rapid Prototyping, 2004, ISBN 0872636976.

Terry Wholers, Wholers Report 2007, ISBN 0975442937.

* cited by examiner

METHOD OF MAKING GOLF CLUBS

CROSS-REFERENCE TO RELATED APPLICATIONS

This application is a continuation of U.S. patent application Ser. No. 12/468,129, filed May 19, 2009 and incorporated in its entirety by reference herein.

BACKGROUND OF THE INVENTION

1. Field of the Invention

The present invention relates to methods of making golf club heads, and more specifically, to a method of making iron type golf club heads using powdered metal rather than conventional metal forgings or castings.

2. Description of the Related Art

Golf clubs are formed through a variety of methods. Commonly, a golf club head is forged or cast and then machined or ground and polished to the requisite dimensions and desired aesthetic quality. These processes have proven to be time consuming and inefficient.

In addition, golf clubs are typically manufactured to fit an average person of average dimensions. Thus, the same club is manufactured regardless of the particular golfer's needs. This standard approach to golf club manufacturing is utilized due to the expensive and time consuming process associated with altering or manufacturing a new mold to incorporate changes in club design. Therefore, in order to save time and money, manufacturers use the same mold that is not readily adjustable with respect to the particular characteristics of the golf club. However, this presents a problem due to the fact that not all golfers are built the same, and not all golfers have identical swings. In addition, due to manufacturing tolerances, many golf clubs that claim to be a particular lie, loft, or face angle may be off by as much as 1°. Due to the variety of golf swings, golfers, and manufacturing flaws and/or tolerances, each individual golfer may benefit from an optimization of lie angle, loft angle, or other club head design parameter.

The lie angle of any golf club is the angle formed between the center of the shaft and the ground line of the club when the club is soled in its proper playing position (address position). Therefore, a taller golfer is likely to benefit from an increase in lie angle, which would allow for the golfer to comfortably address the ball properly. In a similar fashion, a short golfer would probably benefit from a reduction in lie angle.

Loft angle is a measurement, in degrees, of the angle at which the face of the club lies relative to a perfectly vertical face. Using a club with a high loft angle will typically result in a golf shot with a high initial trajectory. In contrast, utilizing a club with a low loft angle will typically result in a golf shot with a low initial trajectory.

Currently, manufacturers rely on post-manufacturing methods for custom fitting golf clubs, the majority of which involve placing the club in a vice and bending the metal until the desired specifications are met. However, frequent modifications or improper bends may result in fatigue of the metal or weakening of the club head.

Finally, due to manufacturing tolerances, current methods of manufacturing frequently require additional steps to bring the club close to the desired specifications. For example, a club head that is designed to have a loft angle of 9° may be manufactured with a loft angle of 8°. Therefore, the additional step of bending the hosel is necessary to achieve the desired loft angle.

As such, there remains a need in the art for a method of manufacturing golf clubs that allows implementation of design variations while maintaining efficiency and cost effectiveness. In addition, there remains a need for a method of manufacturing golf clubs that allows a designer to create a golf club near specifications thereby reducing the need for finishing or bench work.

SUMMARY OF THE INVENTION

The present invention relates to a method of making a golf club head by applying a controlled source of energy to a powdered metal to form a golf club head. The method includes selecting a club design, selecting at least one design parameter, providing a powdered metal, and applying a controlled source of energy to the powdered metal to form a golf club head having a desired design parameter.

The controlled source of energy may include a direct metal laser sintering (DMLS) system, a selective laser melting system, an electron beam melting apparatus, or similar apparatus.

The club design may be selected from a parametric CAD file and then altered according to the designer's specifications. Alternatively, the club design may be selected from a library of CAD files.

The designer may select from a wide range of parameters to customize a golf club head. For example, the designer may select any of the following parameters: weight, weight distribution, bounce angle, lie angle, offset, loft angle, shape, hardness, sole camber, sole width, cavity undercut, center of gravity, face height, hosel outer diameter, hosel inner diameter, hosel taper, hosel depth, toe height, groove width, groove depth, and groove shape.

According to another aspect of the invention, the powdered metal may be used alone or in combination with another powdered metal. Powdered metals suitable for use in the invention include, but are not limited to steel, stainless steel, iron, copper, bronze, aluminum, tungsten, titanium, titanium alloy, chromium-cobalt alloy, and combinations thereof.

In one embodiment, a first powdered metal may be used for a first portion of the club head, and a second powdered metal may be used for a second portion of the club head. The first powdered metal may have a density that is greater than the density of the second powdered metal. For example, the first density may be greater than the second density by about 5 $g/cm^3$. In addition, the first density may be greater than about 10 $g/cm^3$. Alternatively, the first density may be greater than about 7 $g/cm^3$.

In one embodiment, the density is controlled by controlling the porosity of portions of the club head. For example, a first portion may be made of a sintered metal having a first porosity, and a second portion may be made of a sintered metal having a second porosity. The porosity of the first portion may be greater than the porosity of the second portion, which results in a lower density for the first portion.

The low density first portion may occupy about 1% to about 99% of the entire volume of the club head. Alternatively, at least 95% of the total volume of the golf club head is formed from the low density first portion. The porosity of the low density first portion may be about 99% porosity to about 1% porosity. In another embodiment, the low density first portion has a porosity that is greater than about 90%.

BRIEF DESCRIPTION OF THE DRAWINGS

Further features and advantages of the invention can be ascertained from the following detailed description that is provided in connection with the drawings described below.

DETAILED DESCRIPTION OF THE PREFERRED EMBODIMENT

Figure 1:
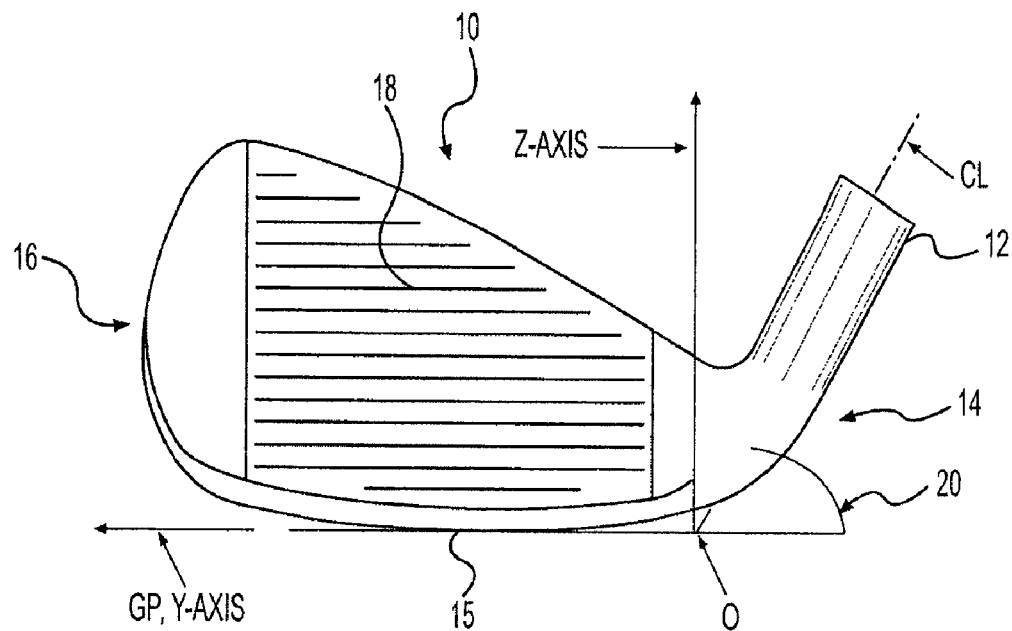
FIG. 1 is a front view of an iron type club head of the present invention.

The present invention is directed to a process for manufacturing golf clubs using an additive process. For example, powdered metal sintering and metal deposition are suitable processes for use in the present invention. The process may be used to manufacture any type of golf club head including, but not limited to: irons, woods, putters, utility clubs, and wedges.

Powdered metal sintering systems involve a bed of metal powder that is sintered or melted layer by layer by a laser or electron beam to create metal parts. After the part has been created, the surrounding powder can be brushed away or shaken out of the part. In addition, a variety of metal powders can be melted in these systems. There are a number of commercially available systems suitable for use in the present invention. For example, the "MCP Realizer", a selective laser melting system, which is the product of Mining and Chemical Products Limited of Germany, can create parts from any number of metals including the following powders: zinc, bronze, stainless steel, titanium, chromium-cobalt, silicon carbine, and aluminum oxide. In addition, various machines from EOS of Germany are available that rely on direct metal laser sintering (DMLS). ARCAM of Sweden produces machines that rely on electron beam melting (EBM) technology.

Direct Metal Laser Sintering (DMLS) has recently emerged outside the golf industry as a way of manufacturing metal parts. The DMLS process involves using a laser that fires into a layer of powdered metal guided by a computer program. DMLS is an "additive" technology that sinters very fine powders layer by layer from the bottom up until the product is completed. The process begins by the input of 3-D CAD files and, a control program converts the CAD files into instructions for controlling the layer by layer formation of the metal parts. The layer by layer formation is accomplished by laser sintering a 'first layer' of approximately 20 to 40 micron powder onto a steel platform. The platform then lowers by approximately 20 to 80 microns, a fresh layer of powder is swept over the previously sintered layer, and the next layer is sintered or added on top of the previously built one. The additive process is repeated until the desired part is complete.

Metal deposition systems use a 3D printing process to create metal parts in a similar manner to how ink is deposited from print heads on an inkjet printer. Multiple heads can be incorporated into these systems to increase the production speed. Metal deposition systems are currently available from FCDBIC AB of Sweden and ProMetal, LLC of Troy, Mich. This process may be used to create a solid part with uniform or non-uniform material properties or to add layers of powdered metal to an existing substrate. For example, a metal deposition device may be employed to coat a portion of a surface of a golf club head with a material that has a high density in order to alter the center of gravity or other design specification of the golf club head.

The general procedure that applies to all machines is to design a part in a 3-D CAD application, convert the CAD file to an STL file, and then transfer the STL file to the machine for processing. "STL" stands for stereolithography, and is a file format that is widely used to describe the shape of a three dimensional object. This file format is supported by many software packages and is widely used for transferring CAD models to rapid prototyping and direct manufacturing machines.

There are several advantages to powdered metal sintering production. For example, batch size and batch configuration, or mixing different quantities of each part depending on the demand for each part, is easily adjustable without significantly affecting part cost. This is a direct result of the ability of the process to rapidly implement production of a new part by merely altering a CAD file or selecting a new CAD file. This is in contrast to parts created from tools for which it is necessary to accurately forecast the quantities of each part so that the appropriate number of tools will be made.

In addition, design time can be reduced by creating functional prototypes directly from the CAD model. Eliminating the need for prototype tooling can reduce the time before prototype designs can be tested for performance, durability and appearance. The development and production time can be shortened for a design by eliminating or reducing the need for other manufacturing processes. For example, DMLS is more efficient than the casting process, because DMLS eliminates the time for creating tools, wax preparation, creating ceramic shells, pouring metal into shells, breaking shells, cutting parts off of casting trees, and grinding off parting lines and weld beads. Further, the process is capable of implementing changes in design without the need to alter or manufacture a new tool or mold. For example, a change in the design of a club head manufactured by a casting process requires the precise modification of the mold or the production of an entirely new mold. This is a time consuming and expensive process. By contrast, the powdered metal sintering process merely requires the changes to be made to a CAD file, and the process will manufacture the club head based on the CAD file. Therefore, changes can be easily implemented by the designer without the need for a halt in production or the construction of new tools or molds.

DMLS and similar machines have further advantages over casting and forging in that DMLS can produce more consistent parts. Current manufacturing methods such as casting result in variation in part weight and size due to manufacturing tolerances and changes in environmental conditions, such as heat and humidity. Due to these inconsistencies, parts are intentionally created with extra size and weight so that they can be ground down to the proper specifications. Parts created on a DMLS machine can be created with more consistent size and weight. Since there is less hand finishing required, parts can be created closer to the net finish size, and fewer adjustments need to be made to account for the manufacturing processes. Part size can be adjusted to match the design model by properly calibrating the DMLS machine. In addition, since powdered metal sintering is an additive process, there is a significant reduction in waste resulting from material that must be cut away after molding or forging.

It is also possible to use the DMLS process to create tooling for conventional processes such as casting, forging, stamping, and injection molding. This tooling can be created directly from the CAD data and does not require programming that is needed for machined tools.

In addition, an additive process such as DMLS can create undercuts or internal channels in tools which would be impossible or difficult to do with a CNC machine. Undercuts and other features may require the use of a support structure, which may be made using an additive process or other known methods. Upon formation of the undercut, the support is removed by a known method. For example, the support may be formed from a polymer material and subsequently heated to remove.

Materials

Suitable materials for use in the process are powdered metals composed of particles with an average diameter of less than about 40 microns. Preferably the average diameter is less than about 25 microns. Alternatively, the average diameter may be less than about 35 microns. The average diameter may be between about 30 and about 40 microns. The powdered metal can be any powdered metal available on the market capable of being sintered and includes, but is not limited to, 303 stainless steel, 304 stainless steel, 431 stainless steel, 432 stainless steel, iron, copper, bronze, aluminum, tungsten, chromium-cobalt alloy, titanium and titanium alloys, or similar materials and combinations thereof. The materials may also be combined with another material in order to vary the composition of portions of the club head to achieve a desired characteristic for a particular portion. For example, 303 stainless steel may be used for the body portions of the club head including the top line, heel, toe, and sole portions of the club and a titanium alloy may be used to produce the face portion of the club head.

Powdered Metal Sintering

The process includes selecting a set of design parameters to match specifications of a specific golfer, providing a powdered metal, and applying energy to the powdered metal to form the club head. In one embodiment a powdered metal sintering process, such as DMLS, is used to form a club head. Initially, the designer inputs a design from a CAD file. However, the system may include a library of existing CAD files or a parametric CAD file that can be modified by inputting a set of new design parameters. The parametric CAD files include a basic shape of the club head, and the designer selects from a list of parameters to customize the club accordingly. The parameters may include, but are not limited to: density, weight distribution, bounce angle, lie angle, offset, loft angle, hardness, sole camber, sole width, cavity undercut, center of gravity, face height, hosel outer diameter, hosel inner diameter/taper, hosel depth, toe height, groove width, groove depth, and groove shape, or combinations thereof.

Referring to FIG. 1, a club head 10 of the present invention has a typical iron type club head shape that includes hosel 12, sole 15, heel 14, and toe 16. A ball striking face 18 has a plurality of parallel, horizontally disposed grooves formed in the surface of the face 18. A lie angle 20 is defined by the center line (CL) of hosel 12 and the horizontal plane (OP) on which the club rests when addressing the ball. The lie angle, in conventional club manufacturing processes, is set when the clubs are forged or cast, and in general, the factory set lie angle is suitable for some golfers, but not all. In forged and cast clubs, the hosel must be bent relative to the remainder of the club head to change the lie angle to suit a particular golfer. In the present invention, the lie angle is one of the parameters that can be customized for each club head of each set to suit the specifications of an individual golfer. Similarly, the bounce angle is defined by the horizontal plane and the line of the sole of the club head next to the club face. This angle can also be adjusted by custom fitting steps, in the prior art, after forging or casting. In the present invention, the bounce angle is another parameter that can be customized for an individual golfer without subsequent processing steps, such as bending, grinding or otherwise working the metal which comprises the club head.

A particularly useful aspect of the powdered metal sintering process is the ability to control the density of various portions of the club head. Varying the density of certain portions of the club head allows the designer to distribute mass throughout the club head in order to control characteristics of the club head such as the center of gravity and moment of inertia. Density control may be accomplished in a variety of ways.

In one embodiment, the process uses at least two different powdered metals or alloys to form the club head. Regions of higher and lower density material, or regions of different materials, can be used to change the center of gravity of the club head, or otherwise redistribute weight in a manner intended to improve playability of the clubs.

Figure 2:
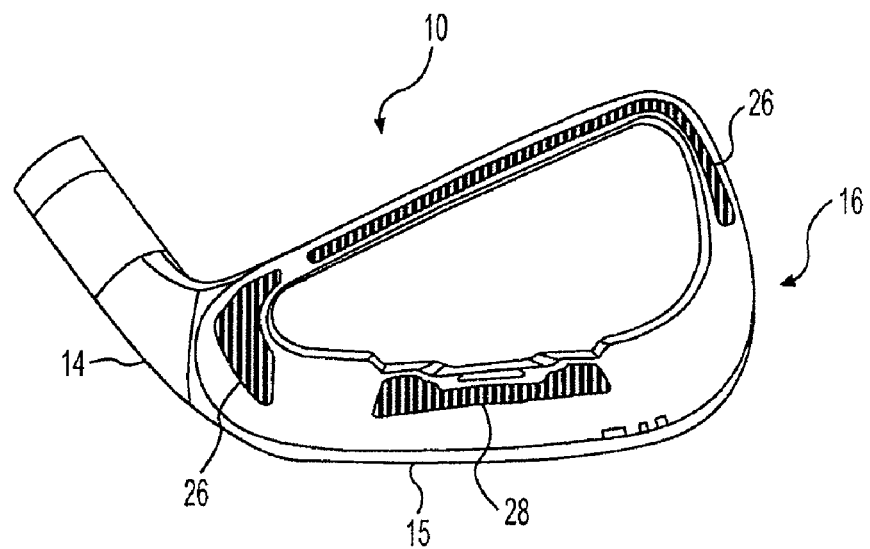
FIG. 2 is a rear view of a cross section of a club head of the present invention.

Referring to FIG. 2, a region of low density material 26 is formed in the topline, heel, and upper toe portions of the club head, and a region of high density material 28 is formed in the lower portion of the club head, thereby achieving a lower center of gravity.

Although, FIG. 2 only shows one orientation of density distribution, the high and low density portions may be distributed in a variety of ways to achieve a desired specification. For example, a material with a high density may be used in one or more "heavy" portions, and a material with a low density may be used in one or more "light" portions. The heavy portions may be formed from a material with a density greater than about 1 g/cm$^3$. According to one aspect of the invention, the heavy portions may be formed from a material with a density greater than about 3 g/cm$^3$. In one embodiment, the heavy portions may be formed from a material with a density greater than about 7 g/cm$^3$. In one embodiment, the heavy portions are formed from a material with a density greater than about 10 g/cm$^3$, In another embodiment, the heavy portion is composed of a material with a density that is greater than about 15 g/cm$^3$, In addition, the heavy portion may have a density that is greater than the light portion(s) by at least about 1 g/cm$^3$. In another embodiment, the heavy portion has a density that is greater than the light portion by about 3 g/cm$^3$. The heavy portion has a density that is greater than the light portion by about 5 g/cm$^3$. Alternatively, the material of the heavy portion may have a density that is greater than the material of the light portion by about 10 g/cm$^3$.

In another embodiment, the density of various portions of the club head is controlled by varying the porosity of the sintered metal. Porosity is a measure of the void spaces in a material, and is measured as a fraction, between 0-1, or as a percentage between 0%-100%. For example, by controlling the amount of powder, it is possible to control the density, in terms of porosity, of the particular powdered metal used in the process, Typically, when a metal part is manufactured, it is expected that the finished product has approximately 0% porosity, with limited inclusions.

By using the formation methods of the present invention, it is possible to change the porosity of the material, layer by layer, area by area, to achieve a desired density. This is accomplished by varying the amount of powdered metal used for certain areas of the club head. A reduction in the amount of powder used for a particular layer results in a layer with a greater porosity and a lower density.

Figure 3:
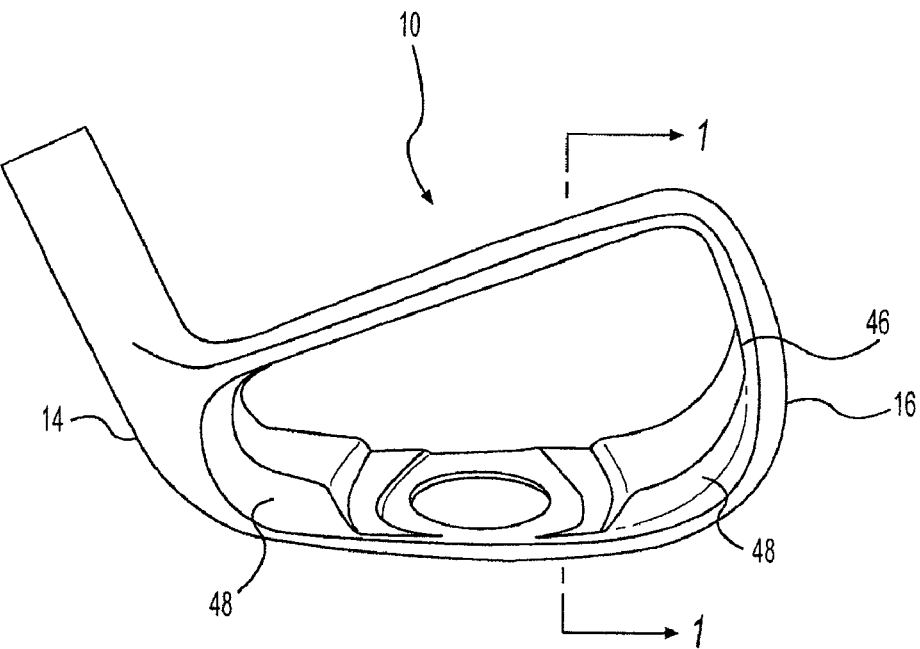
FIG. 3 is a rear view of a club head of the present invention.

Referring to FIG. 3, a club head 10 has a hosel 12, a heel 14 and toe 16. A sole 15 extends between the heel 14 and toe 16. The rear surface 48 is shaped to have a centrally located low density portion 46 surrounded by a higher density portion 48. In effect, club head 10 behaves similar to a cavity-back type club because the orientation of low density portion 46 allows for mass to be freed up and distributed towards the perimeter of the club head. This orientation leads to an increase in the moment of inertia (MOI) of the club head. Inertia is a property of matter by which a body remains at rest or in uniform motion unless acted upon by some external force. MOI is a measure of the resistance of a body to angular acceleration about a given axis, and is equal to the sum of the products of each element of mass in the body and the square of the element's distance from the axis. Thus, as the distance from the axis increases, the MOI increases, making the club more forgiving for off-center hits. In addition, moving or rearranging mass to the club head perimeter enlarges the sweet spot and produces a more forgiving club.

Figure 5:
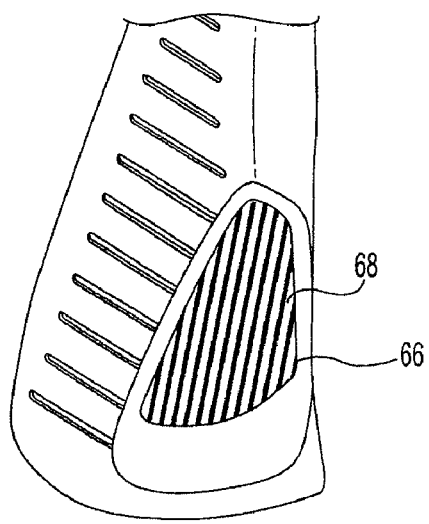
FIG. 5 is a cross sectional view of a club head of the present invention taken along 1-1 of FIG. 3.

For example, the porosity and the density may be altered using a DMLS process. The process may be programmed to space lines of material placed on a substrate to form a layer. The program may allow for a wide space between the lines, which results in a layer formed from less powder. This process forms a layer with a high percentage of porosity and low density. By contrast, a layer may be formed wherein the DMLS process is programmed to place little or no space between the lines. The lack of space between the lines results in a layer that is formed with a low porosity and a high density. FIG. 5 shows an example of the interior of a club head where spaces (66) and lines of material (68) form the interior of a club head.

Figure 4:
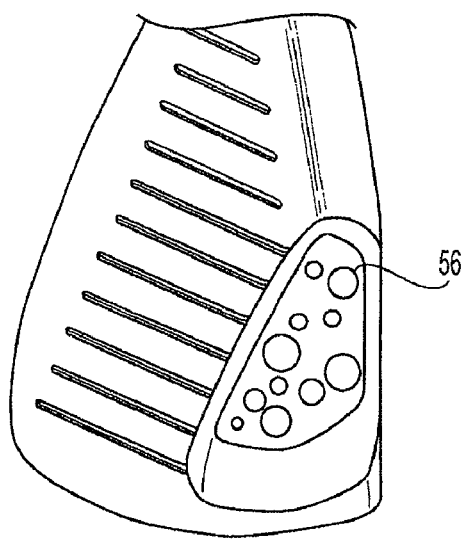
FIG. 4 is a cross sectional view of a club head of the present invention taken along 1-1 of FIG. 3.

Another method of increasing porosity is to program the process to leave pockets or voids where no material is placed on the substrate. FIG. 4 shows the interior of a club head where voids 56 contain no material.

In one embodiment, voids or spaces are formed by programming a process as outlined above. The voids may be interconnected throughout the club head. Next, one or more of the voids or spaces are filled with a light weight polymer or other low density material. Alternatively, the interior of the club head may comprise a skeleton or frame made with a high porosity. A low density material may then be injected to fill the areas in and around the frame. The low density material may have a density that is less than about 1.3 g/cm$^3$.

In one embodiment, a first amount of material may be used for the formation of layers for a first portion of the golf club head, and a second amount of material may be used for the formation of layers for a second portion of the golf club head. The first amount of material is less than the second amount of material, which results in a club head with a first portion that is more porous than the second portion. Therefore, the density of the first portion is less than the density of the second portion. This allows for a lighter overall structure, freeing up weight to optimize play characteristics of the golf club.

In one embodiment, the first portion may comprise about 1% to about 99% of the entire volume of the club head. The first portion may comprise about 5% to about 95% of the entire volume of the club head. In another embodiment the first portion may comprise at least about 95% of the total club head volume. In another embodiment, the first portion of the club head may comprise greater than about 85% of the total volume of the club head.

For example, the first portion may comprise the interior of the club head and the second portion may comprise only the surface of a portion of the club head. In one embodiment the surface of the club head is less than about 0.050 in. thick. Alternatively, the surface of the club head is less than 0.040 in. thick. In another embodiment, the surface is about 0.030 in. thick.

In addition, the porosity of the first portion may range from about 99% porosity to about 1% porosity. In one embodiment, the porosity of the first portion ranges from about 95% to about 5%. Alternatively, the porosity of the first portion may be greater than 90%. The porosity of the first portion may range from about 20% to about 80%. In another embodiment, a third portion may be formed that has a porosity that is greater than the first porosity, which results in a greater density for the first portion in comparison to the third portion.

In another embodiment, a hollow club head may be created using the powdered metal sintering process in combination with a conventional method. Portions of the club head may be made according to the process described above, and subsequently the portions are joined by a welding process. For example, a front portion may include the face and the sole, and a back portion may be welded to the front portion in a manner that creates a hollow area between the front and back portion.

Metal Deposition

Another aspect of the present invention is to utilize a metal deposition process to coat a substrate with powdered metal. For example, an existing part or club head may be inserted into the metal deposition apparatus, to apply a coating material to be part of the club head. This process may be used to apply a protective layer over parts of the club that come into contact with objects. For example, the sole of the club may be coated with a material that is harder than other parts of the club in order to prevent damage from repeated impacts with the ground.

In one embodiment, the designer uses the metal deposition process to coat selected portions to achieve a desired club attribute such as center of gravity, moment of inertia, hardness, or other club characteristic. For example, a high-density material may be deposited onto the heel portion of the club in order to move the center of gravity toward the heel of the club.

By contrast, a low density substrate may be coated with a powdered metal. The substrate may be a polymer or non-metallic in nature. For example, a low density polymer can be coated with a powdered metal to form a club head. As a result, the club head is made lighter and mass can be added to desired locations to achieve various specifications such as moment of inertia, center of gravity, hardness, or other characteristic.

In one embodiment, a portion of a substrate may be coated with a metallic coating by utilizing a vapor deposition or chemical deposition process in combination with a metal deposition process.

In addition, the modification techniques described for the powdered metal sintering process are also applicable in the metal deposition process. Specifically, the density, hardness, and weight distribution can be modified by utilizing powdered metals of different densities and/or varying the porosity of the sintered metal.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety.

What is claimed is:

1. A method of making a portion of a golf club head for playing golf comprising:
    providing a powdered metal material comprising a metal; and
    forming a metal portion of the golf club head layer by layer from the powdered metal material by depositing the powdered metal material on a substrate layer by layer and leaving at least one void where no material is placed on the substrate with the result that the metal portion has at least one void space formed therein.

2. A method of making a portion of a golf club head for playing golf comprising:
    providing a powered metal material comprising a metal; and
    forming a metal portion of the golf club head layer by layer from the powered metal material,
    wherein a first portion of the metal portion has a first density and a second portion of the metal portion as a second density different from the first density and further wherein the metal portion of the golf club head is formed having at least one void space therein.

3. A method of making a portion of a golf club head for playing golf comprising:
    providing a powered metal material comprising a metal; and
    forming a metal portion of a golf club head layer by layer from the powdered metal material,
    Wherein a first portion of the metal portion has a first density and a second portion of the metal portion has a second density different from the first density and further wherein a region of a topline, a heel, and an upper toe portion of the golf club head is formed of the metal.

4. A method of making a portion of a golf club head for playing golf comprising:
    providing a powdered metal material comprising a metal; and
    forming a metal portion of the golf club head layer by layer from the powdered metal material,
    wherein a first portion of the metal portion has a first porosity, a second portion of the metal portion has a second porosity, and the first porosity is different from the second porosity and further wherein the first portion comprises at least 95% of a total volume of the golf club head.

5. A method of making a portion of a golf club head for playing golf comprising:
    providing a powdered metal material comprising a metal; and
    forming a metal portion of the golf club head layer by layer from the powdered metal material,
    wherein a first portion of the metal portion has a first porosity, a second portion of the metal portion has a second porosity, and the first porosity is different from the second porosity and further wherein the powdered metal material comprises particles with an average diameter of less than about 40 microns.

6. A method of making a portion of a golf club head for playing golf comprising:
    providing a powdered metal material comprising a metal; and
    forming a metal portion of the golf club head layer by layer from the powdered metal material,
    wherein a first portion of a metal portion has a first porosity, a second portion of the metal portion has a second porosity, and the first porosity is different from the second porosity and further wherein the metal portion comprises at least on internal channel.

* * * * *